Aug. 23, 1932. J. B. GLOWACKI 1,873,384
COMBINATION STEM, INSULATION JOINT, AND HICKEY
Filed Feb. 3, 1930 3 Sheets-Sheet 1
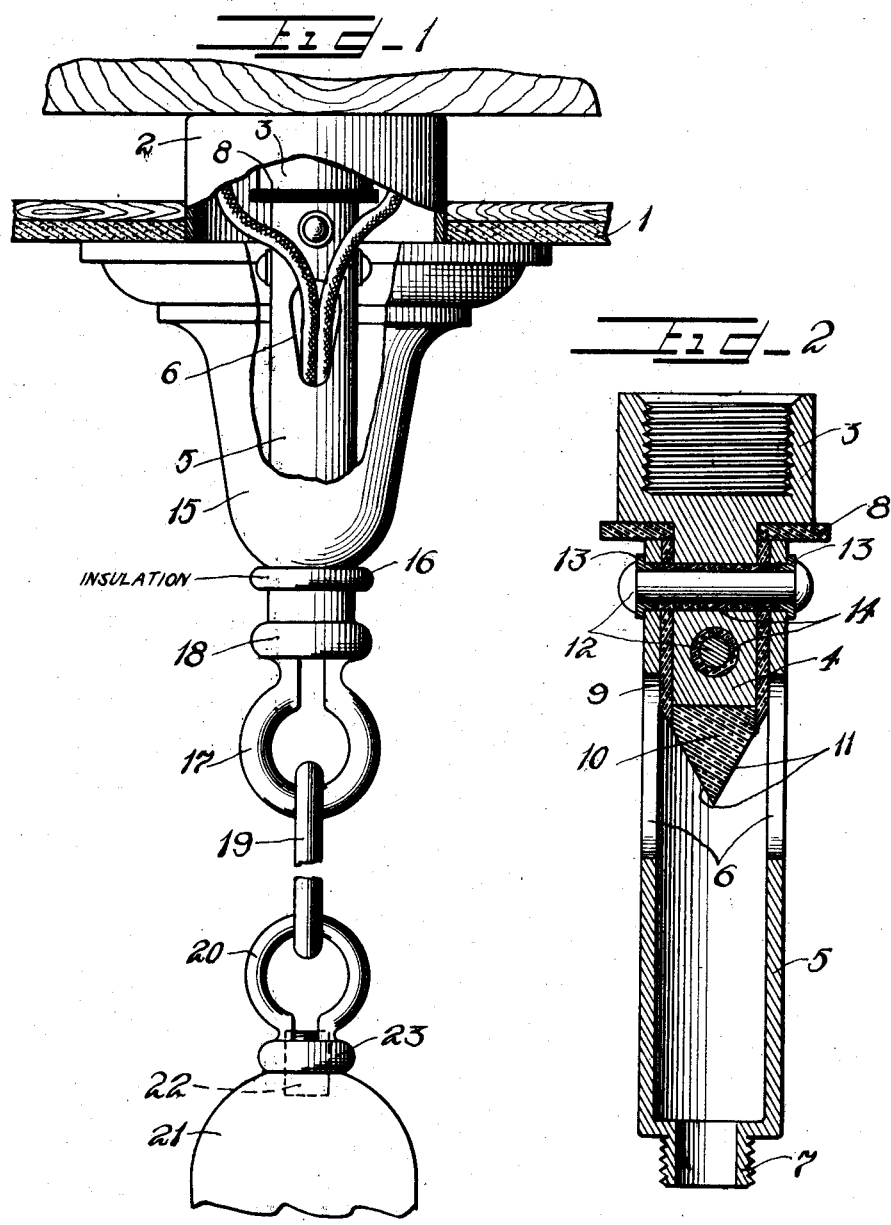
Inventor
John B. Glowacki
by Charles H. Mills Attys.

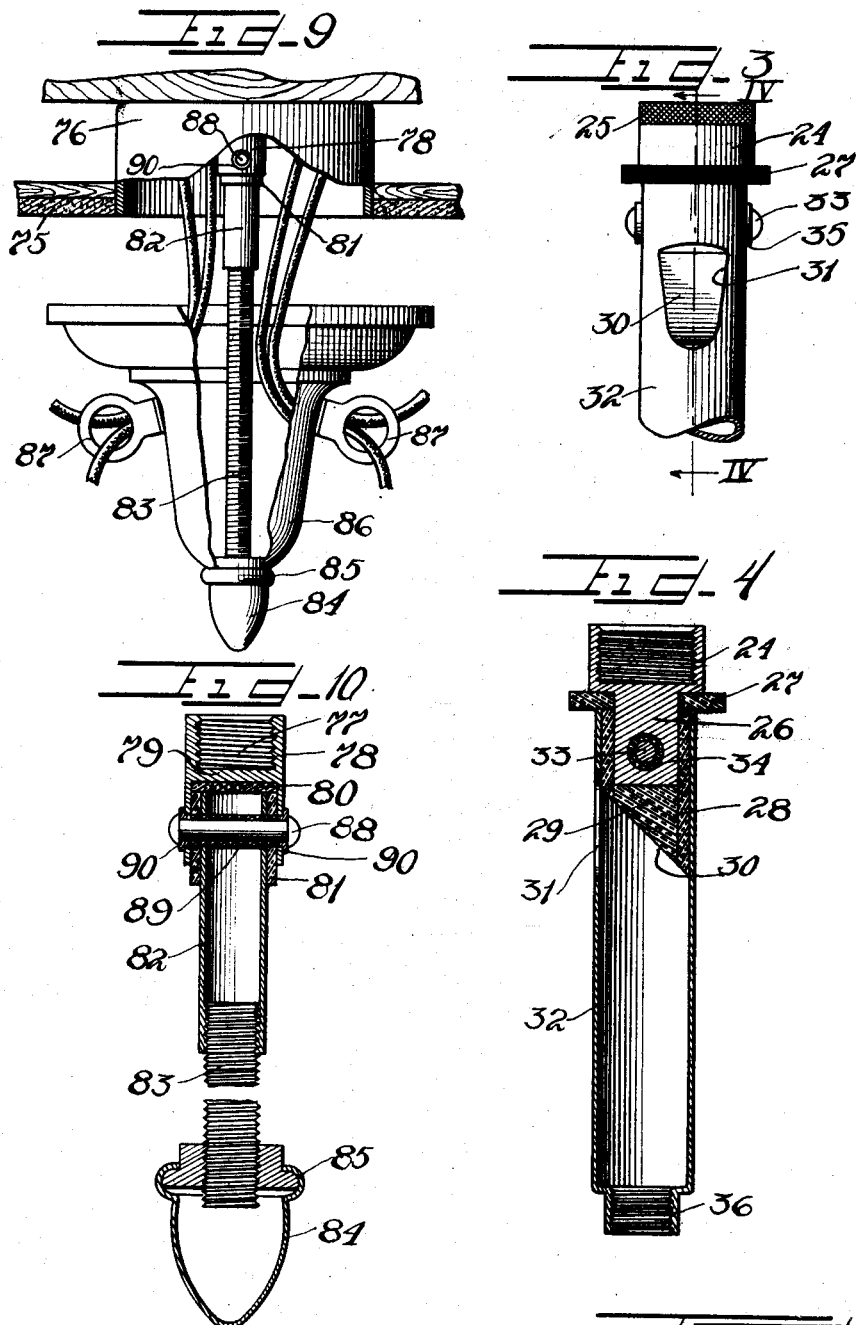

Aug. 23, 1932.   J. B. GLOWACKI   1,873,384
COMBINATION STEM, INSULATION JOINT, AND HICKEY
Filed Feb. 3, 1930   3 Sheets-Sheet 3
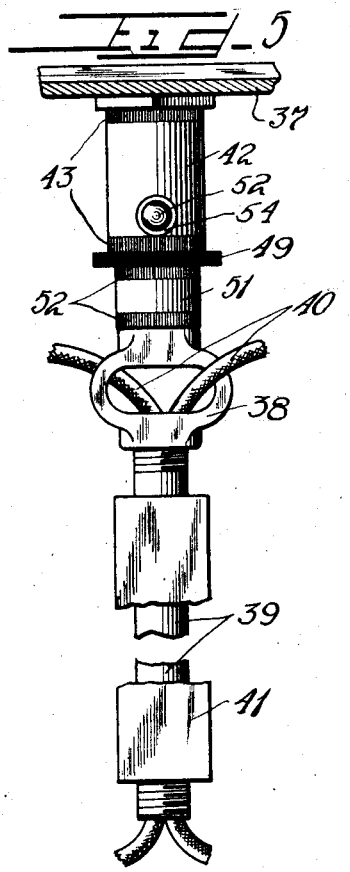
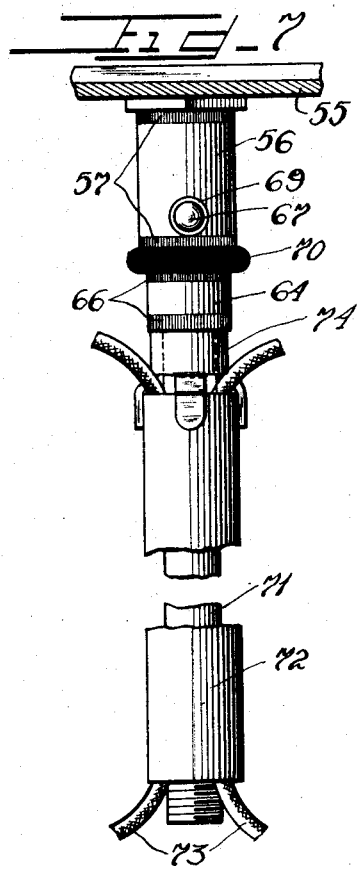
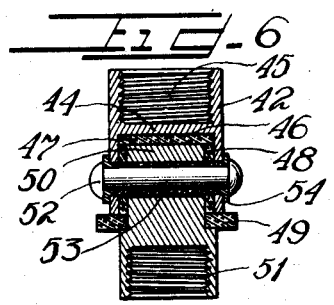
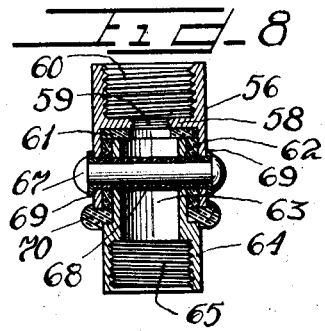
Inventor
John B. Glowacki
by Charles F. Wells Attys Patented Aug. 23, 1932

1,873,384

UNITED STATES PATENT OFFICE

JOHN B. GLOWACKI, OF CHICAGO, ILLINOIS

COMBINATION STEM, INSULATION JOINT, AND HICKEY

Application filed February 3, 1930. Serial No. 425,411.

This invention relates to an improved type of combination stem, insulation joint and hickey adapted for connecting and supporting electric light fixtures, combination electric light and gas fixtures and the like to an outlet box mounted in a ceiling or in a wall. The improved connecting unit of this invention embraces a fixture stem adapted to be formed with or without a hickey, a joint for connecting the stem in an outlet box, and insulating members disposed between the stem and the joint to complete the unit, affording an arrangement whereby a fixture supported on the lower end of the hickey stem is insulated from the outlet box and permits the wires from the fixture to be projected upwardly through the stem and out of the hickey to permit the wires to be connected with the wires in the outlet box prior to moving the fixture canopy into engagement with the ceiling.

It is an object of this invention to provide an improved combination stem, insulation joint and hickey for either light-weight or heavy fixtures of either the all electric or combination electric and gas type, said device having the stem and the joint thereof separated by insulating members and insulation rivets or bolts to provide a construction wherein the stem is properly insulated from the outlet box in which the joint is adapted to be engaged.

It is a further object of this invention to provide an improved fixture-supporting unit wherein a stem and coupling are connected by rivet means and are separated from one another by insulating members which also serve to insulate the rivet means from the coupling.

It is furthermore an object of this invention to provide an improved type of fixture-supporting unit wherein the stem and hickey are supported on a coupling or joint and are separated therefrom by insulating means to insulate the fixture from the outlet box.

Another object of the invention is to provide an improved type of fixture supporting unit embracing a stem and a coupling which are rigidly secured together and are separated by insulating means having a portion thereof shaped to provide a guide whereby the wires from a fixture are adapted to be conveniently guided out of hickey openings provided in the stem to facilitate attachment of the wires to the feed wires in an outlet box in which the fixture-supporting unit is engaged.

It is an important object of this invention to provide an improved fixture-supporting unit for supporting either electric or combination gas and electric fixtures, said unit embracing a stem and joint which are rigidly connected together by rivet means, said stem and joint being separated by insulating members which also serve to insulate the rivet means from the joint, so that a fixture supported by the supporting unit is properly insulated from the outlet box.

Other and further important objects of this invention will be apparent from the disclosures in the specification and the accompanying drawings.

The invention (in a preferred form) is illustrated in the drawings and hereinafter more fully described.

On the drawings:

Figure 1 is a fragmentary elevational view illustrating an improved combination stem, insulation joint and hickey embodying the principles of this invention and mounted in position to support a fixture and canopy from a ceiling outlet box.

Figure 2 is a longitudinal central enlarged detail section of the improved combination stem, insulation joint and hickey of the type illustrated in Figure 1 and designed for supporting heavy fixtures.

Figure 3 is an elevational view, partly broken away, of a modified form of combination stem, insulation joint and hickey for light-weight or medium-weight fixtures provided with a single hickey opening and a single insulated retaining rivet.

Figure 4 is a longitudinal central section of the modified form of combination stem, insulation joint and hickey illustrated in Figure 3, with said section taken on line IV—IV of Figure 3.

Figure 5 is an elevational view of a modified form of insulation joint or coupling adapted to be connected in a ceiling outlet box and furthermore adapted to permit the ordinary type of hickey and stem pipe to be connected therewith to assist in supporting an electric fixture from the outlet box and properly insulated therefrom.

Figure 6 is a longitudinal central section of the fixture-supporting insulating joint of the type illustrated in Figure 5, with the rivet shown in elevation.

Figure 7 is a fragmentary elevational view of another modified form of insulating joint or coupling for use in an outlet box and having insulating members separating upper and lower sections thereof with certain of said insulating members adapted to be cast in position to provide a gas-tight joint between the sections of the joint, permitting the improved joint to be used for supporting a combination gas and electric fixture in position by means of an ordinary hickey, stem sleeve and a gas supply pipe.

Figure 8 is a longitudinal central section of the modified form of combination insulation joint illustrated in Figure 7.

Figure 9 is a fragmentary elevational view of another modified form of insulation joint or coupling connected in an outlet box and supporting a canopy-supporting screw stem adapted to support a canopy of the multiple fixture chain supporting type.

Figure 10 is an enlarged fragmentary longitudinal section of the modified form of insulation joint and canopy-supporting stem of the type illustrated in Figure 9, with parts shown in elevation.

As shown on the drawings:

The reference numeral 1 indicates a ceiling or wall having mounted therein an outlet box 2 adapted to have supported therein an improved combination stem, insulation joint and hickey of the heavy fixture-supporting type. The improved fixture-supporting unit as illustrated in Figures 1 and 2 comprises an internally threaded cap or cup 3 closed at one end and having integrally formed axially thereon a shaft or shank 4. The cap and shank form a coupling or joint constructed of metal, with said cap 3 adapted to be removably engaged on a threaded supporting boss provided in the outlet box 2.

The fixture-supporting unit also comprises a metal stem or tube 5 having a pair of oppositely positioned hickey openings 6 provided near one end thereof. Integrally formed on the lower end of the stem 5 is an externally threaded neck or passaged shank 7 of a diameter less than the diameter of the stem 5.

Tightly engaged around the shank or shaft 4 of the joint or coupling and seated against the closed end of the cap 3 is an insulation washer or ring 8. Tightly fitting over the coupling shank 4 is an insulation sleeve or collar 9 having one end thereof seating tightly against the insulation ring or washer 8. The opposite end of the insulation sleeve 9 projects beyond the end of the shaft or shank 4 and is filled with a quantity of insulating material to form a plug 10. The plug 10 and the insulation sleeve 9 are cut V-shaped to afford inclined wire guide surfaces 11 which are positioned within the stem 5 to the inside of the hickey openings 6, as clearly illustrated in Figure 2.

For the purpose of rigidly securing the stem 5 and the insulation joint together, the upper end of the stem 5, together with the insulation sleeve 9 and the joint shank or stub shaft 4, are provided with a pair of diametric passages disposed at right angles with respect to one another for the reception of insulated retaining means, each of which comprises a rivet 12 provided with flanged washers or collars 13 adjacent the inner sides of the rivet heads and positioned to the outside and adjacent the ends of an insulation sleeve 14 which is engaged around the body or shank of the rivet and insulates the rivet from the shank or stub shaft 4 forming part of the joint or coupling of the device.

From the description of the improved combination stem, insulation joint and hickey illustrated and described, it will be noted that the metal stem 5 is rigidly connected with the metal coupling or joint by means of the improved rivets and is insulated from said joint or coupling by the insulation members 8, 9 and 14. The V-shaped block of insulating material secured in the end of the insulation sleeve 9 affords a tapered guide for facilitating threading of the fixture wires through the stem 5 and out through the hickey openings 6.

Slidably engaged on the fixture-supporting stem 5 is a fixture canopy 15 which is supported on an insulation slip ring 16 which has frictional clamping engagement with the stem 5 to permit the slip ring to be slidably moved upwardly on the stem to move the canopy into contact with the ceiling 1 when the coupling of the fixture wires and the wires in the outlet box 2 has been completed.

Removably engaged upon the threaded shank 7 of the stem 5 is an upper split fixture-supporting loop 17 having a lock ring 18 engaged around the supported split end thereof to hold the split loop locked in engagement with the stem shank 7. Engaged in the upper split fixture-supporting loop 17 is a fixture-supporting chain 19, the lowermost link of which is adapted to be engaged in a lower split fixture-supporting loop 20 which is connected to a heavy fixture 21 by means of an externally threaded nipple or connector 22 and a lock ring 23.

The improved combination stem, insulation joint and hickey illustrated in Figure 2 is primarily adapted for supporting heavy fixtures having a plurality of sets of wires leading therefrom upwardly through the stem 5, with said sets of wires adapted to be divided so that half of the wires are permitted to project through one of the hickey openings 6 while the other half of the wires are permitted to project through the second hickey opening 6 to be connected with the wires in the fixture-supporting outlet box 2.

The improved combination stem, insulation joint and hickey illustrated in Figures 1 and 2 is adapted to have a heavy fixture 21 connected to the end of the stem 5 by means of the chain 19 and the split supporting loop members 17 and 20, with the wires from the fixture projecting upwardly through the stem 5 and out of the hickey openings 6 provided for the purpose. The wires are guided out through the openings 6 by means of the guide surfaces 11 provided by the guide plug 10 of the unit. With a canopy 15 and a slip ring 16 engaged on the stem 5 and with the fixture properly connected to the lower end of the stem 5 by means of the split loops and the chain, the entire fixture unit as assembled is adapted to be elevated in position so that the joint cup 3 may be threaded onto the supporting boss or unit provided within the ceiling outlet box 2. With the fixture supported by means of the improved combination stem, insulation joint and hickey as described, the wires projecting out of the hickey openings 6 are adapted to be connected with the wires within the outlet box 2 while the canopy is in a lowered position on the stem 5. After the wires have been properly connected, the slip ring 16 is pushed upwardly on the stem 5, thereby raising the canopy until the upper end of the canopy is moved into seating contact with the ceiling 1 to enclose the wires and the upper portion of the combination stem, insulation joint and hickey.

Figures 3 and 4 illustrate a modified form of combination stem, insulation joint and hickey adapted for use in supporting light-weight or medium-weight fixtures. The modified form of fixture-supporting unit comprises a joint or coupling consisting of an internally threaded cap or cup 24 which is externally knurled at 25. The cup 24 is closed at one end and has integrally formed axially thereon a shank or shaft extension 26. Engaged around the shank 26 adjacent the closed end of the cup 24 is an insulation disc or washer 27 which is held in place by means of an insulation sleeve or collar 28 which is long enough to extend beyond the end of the shank 24 and has the end thereof closed by means of an insulation filling or plug 29. The plugged end of the insulation sleeve 28 is cut off at an angle to provide an inclined guide surface 30 which, as clearly illustrated in Figure 4, is positioned opposite a hickey opening 31. The hickey opening 31 is provided near one end of a fixture-supporting stem 32 into one end of which the insulation joint is tightly forced. For the purpose of rigidly holding the insulation joint and the stem secured together, said stem and the insulation sleeve 28 and the joint shank 26 are drilled diametrically to provide an opening for the reception of a retaining member comprising a rivet 33 having an insulation sleeve or collar 34 engaged around the body portion thereof with the ends of said insulation sleeve separated from the heads of the rivet by means of flanged metal washers 35 similar to the arrangement illustrated in Figure 2. The insulation sleeve 34 serves to insulate the metal shank 26 from the metal stem 32.

The lower end of the fixture-supporting stem 32 is provided with an integral reduced shank or neck 36 which is internally threaded to afford a female connection for the reception of an externally threaded male type of fixture supporting unit.

The modified form of combination stem, insulation joint and coupling illustrated in Figures 3 and 4 is adapted to be used for supporting a fixture similar to the adaptation of the heavy fixture-supporting unit described in connection with Figures 1 and 2 of the drawings.

Figures 5 and 6 illustrate another modified form of fixture-supporting unit embracing an insulation joint or coupling adapted to be connected in a ceiling outlet box 37 and have engaged in one end thereof a hickey unit 38 which, in turn, has attached thereto one threaded end of a stem pipe 39 through which the fixture wires 40 project. Engaged over the stem pipe 39 is a stem sleeve 41 of any desired shape and design and adapted to have a fixture canopy and a canopy-supporting slip ring engaged thereon similar to the arrangement illustrated in Figure 1.

With the stem pipe 39 connected to the hickey 38, the lower externally threaded end of said stem pipe is adapted to have a female type of split loop unit engaged thereon to support a fixture on the lower end of the fixture-supporting unit similar to the showing in Figure 1.

The improved type of insulation joint or coupling illustrated in Figures 5 and 6 comprises a metal sleeve or housing 42 externally knurled at both ends of the housing at 43. The sleeve or housing 42 is provided with a partition 44 dividing the interior of said sleeve into an internally threaded cup chamber 45 and a second, plain, chamber 46. Seated in the chamber 46 against the partition 44 is an insulation disc 47 which is held in place by means of an insulation sleeve or collar 48, the outer end of which is flush with the lower end of the sleeve or housing 42 and has seated thereon an insulation disc or washer 49.

Tightly projecting through the insulation washer 49 and into the insulation sleeve 48 is a shank 50 which is integrally formed axially on the closed end of an internally threaded cap or cup 51 which is externally knurled at 52, as illustrated in Figure 5. The internally threaded cup 51 is provided for the reception of an externally threaded screw shank which is integrally formed on one end of the hickey 38.

The sleeve 42, the insulation collar or sleeve 48 and the shank 50 are drilled diametrically to provide an opening for the reception of a retaining unit comprising a double-headed rivet 52 having an insulation sleeve or collar 53 engaged around the body portion thereof between a pair of flanged bushings or washers 54. The flanged bushings or washers 54 are positioned to the inside of the heads of the rivet 52. The retaining unit rivet 52 is thus insulated from the shank 50 of the metallic cup 51 to which the hickey 38 is adapted to be connected. This improved type of insulation joint or coupling permits a fixture to be supported in position and connected with an outlet box, with the fixture insulated from the outlet box.

Figures 7 and 8 illustrate another modified form of improved joint or coupling unit of the insulation type adapted to be disposed intermediate a ceiling outlet box and a combination gas and electric fixture. In this form of the device, the reference numeral 55 indicates a fragmentary portion of an outlet box supported in a wall or ceiling and having supported therein an improved joint or coupling of the insulation type comprising a sleeve or housing 56 which is externally knurled at 57. Integrally formed transversely within the sleeve 56 is a partition 58 provided with a threaded gas supply opening 59. The partition 58 divides the interior of the sleeve 56 into an upper chamber 60 which is internally threaded to permit the same to be secured on a threaded projection provided in the outlet box 55 and having a gas supply pipe connected therewith. The second chamber provided in the lower end of the sleeve 56 has an apertured insulation disc or ring 61 engaged therein seated against the partition 58. The apertured insulation disc 61 is held in position by an insulation sleeve or collar 62 which is engaged around a passaged shank or stub shaft 63 which is integrally formed on the inner end of an enlarged cup or cap 64 which is internally threaded at 65. The exterior of the cap 64 is knurled at 66. A diametric passage is provided in the sleeve 56, the insulation collar 62 and the shank 63 to receive a retaining unit which comprises a double-headed rivet 67, around the shank or stem of which an insulation sleeve or collar 68 is engaged. Positioned adjacent the inner side of the rivet head and against the end of the insulation sleeve 68 are a pair of flanged metal washers or bushings 69. The rivet unit rigidly holds the parts secured together with the lower cup section 64 insulated from the upper sleeve section 56 by the insulation members 61 and 62 and the insulation sleeve 68 engaged around the shank of the rivet.

A circular groove is provided between the inner end of the cap 64 and the lower end of the insulation sleeve 62 and said groove is adapted to have poured or cast therein an insulation washer or ring 70 which forms a gastight joint between the metal members forming the combination insulation joint or coupling.

Threaded into the threaded chamber 65 of the cap 64 is the upper threaded end of a gas stem pipe 71 having a stem sleeve 72 loosely engaged thereover and affording a space between the pipe 71 and said sleeve 72 to permit the wires 73 from a combination gas and electric fixture to be projected upwardly between the pipe 71 and said sleeve 72 and out of openings provided in a hickey fork or spider 74, the tongues or fingers of which are engaged over the upper end of the stem sleeve 72 as clearly illustrated in Figure 7, leaving outlet openings for the upper ends of the wires to permit said wires to be connected with the wires in the outlet boxes 55.

The combination gas and electric fixture is adapted to be connected to the lower externally threaded end of the stem gas pipe 71 by means of split loop members similar to the arrangement illustrated in Figure 1. Gas is adapted to be admitted from the gas supply pipe forming part of the outlet box 55 through the combination joint or coupling by way of the aperture 59 and the opening in the insulation disc 61 through the tubular shank 63 of the cup member 64 and then through the stem pipe 71 into the gas burners or jets forming part of the combination fixture. In case the gas supply to the fixture is no longer desired, it is merely necessary to engage a plug screw in the threaded opening 59 of the partition plate 58 to close off the gas supply from the outlet box 55.

Figures 9 and 10 illustrate another modified form of the device in the form of a combination insulation joint and canopy-supporting screw unit adapted to carry or hold a fixture-supporting canopy in position against a ceiling or wall. In the form of the device as disclosed in Figures 9 and 10, the reference numeral 75 indicates a ceiling or wall having an outlet box 76 mounted therein. Engaged on a threaded boss or shank provided in the outlet box 76 is the internally threaded chamber 77 provided in a cap or sleeve 78 having an integral transverse partition formed therein to separate the cup chamber 77 from a plain chamber provided in the lower end of the sleeve 78. Seated in the plain chamber against the under surface of the partition 79 is an insulation disc 80 which is held in place by means of an insulation sleeve or collar 81 which projects out of the lower end of the sleeve 78. Projecting into the insulation sleeve 81 is the upper end of a stem sleeve 82, the lower end of which is internally threaded to adjustably receive the upper end of a threaded stem rod or screw 83. Adjustably threaded on the lower threaded end of the stem screw 83 is a hollow canopy-supporting knob or head 84 provided with a bead or seat 85 against which the lower end of a fixture-supporting canopy 86 is adapted to seat. The canopy 86 is provided with a plurality of openings and with a plurality of chain supporting rings 87 through which the various pairs of wires leading from an electric fixture are adapted to project into the canopy 86 to be connected with the feed wires in the outlet box 76. The electric light fixture is adapted to be connected to the canopy by means of chains or other suitable connectors to the ring members 87 secured on the exterior of the body portion of the canopy.

To rigidly hold the stem sleeve 82 connected with the housing or sleeve 78, a retaining unit is engaged diametrically through a diametric passage provided in the members of the joint, and said retaining means comprises a double-headed rivet 88 having an insulation sleeve or collar 89 engaged around the shank thereof. The ends of the insulation sleeve 89 are separated from the heads of the rivet 88 by means of flanged washers or bushings 90. It will thus be noted that the improved modified form of joint or coupling is of the insulation type whereby the fixture and canopy supported on the knob or head 84 is adapted to be insulated from the outlet box by means of the insulation disc 80, the insulation sleeve 81 and the insulation collar or sleeve 89 forming part of the rivet unit.

The insulation joint or coupling sleeve 78 is adapted to be threaded into the outlet box 76 with the stem sleeve 82 projecting downwardly. A fixture which is to be supported in position is connected with the canopy by means of chains and the required number of wires, and the screw stem 83 is engaged through the openings in the end of the canopy 86, with the lower end of said canopy seated against the bead or flange 85 forming part of the knob or head 84. The screw stem 83 is now raised and the end thereof is threaded into the threaded end of the stem sleeve 82, with the upper end of the canopy 86 spaced a short distance beneath the ceiling 75 to afford sufficient space to permit the wires from the fixture to be connected with the wires in the outlet box 76. After the wires have been properly connected, the fixture may be held in supported position by holding the canopy 86 and rotating the knob 84 to thread the same onto the stem screw 83 until the lower end of the screw stem 83 seats within the lower end of the knob 84. When this occurs, the screw stem 83 continues to screw upwardly through the lower threaded end of the stem sleeve 82 until the upper end of the fixture-supporting canopy 86 is brought into contact with the ceiling or wall 75.

The various types of stem, insulation joint and hickey combinations are adapted to facilitate supporting fixtures connected with and insulated from an outlet box provided with means adapted to have one end of the insulation joint or coupling secured thereto. The various insulation joints are provided with suitable insulating members and insulated rivets which serve to insulate fixtures supported by the stem members from the joint or coupling and from the outlet box which affords a support therefor.

One or more insulation rivets may be used on any of the various types of fixture-supporting units, depending on whether the units are adapted for supporting light or medium-weight fixtures or heavy fixtures. The improved insulation rivets are of a type adapted to afford sufficient support for a fixture even when the insulation collars and other insulation members forming a part of the insulation unit may accidentally become worn out or burned up. This construction insures supporting of the fixture and obviates any danger of the fixture falling when the insulating members are burned or become worn through.

The improved fixture-supporting unit may be of the hickey stem type illustrated in Figures 1 to 4, inclusive, or of the independent hickey type illustrated in Figures 5 to 8, inclusive. Attention is also called to the fact that the improved insulation joint or coupling may be of the canopy-supporting type as illustrated in Figures 9 and 10, wherein no hickey is provided, since the wires from the fixture are adapted to be projected through the canopy and connected with the wires in the outlet box.

The improved insulation joint or coupling may be adapted for use with electric fixtures or with combination electric and gas fixtures, in which case the apertured type of joint or coupling illustrated in Figure 8 is adapted to be used.

It will, of course, be understood that various details of construction may be varied through a wide range without departing from the principles of this invention, and it is, therefore, not purposed to limit the patent granted hereon otherwise than necessitated by the scope of the appended claims.

I claim as my invention:

1. A fixture-supporting unit comprising a pair of interfitting members adapted to be connected between an outlet box and a fixture, insulating means separating said interfitting members, an insulation rivet rigidly securing said interfitting members together with the insulating means locked therebetween, one of said interfitting members having a hickey opening therein, and an insulation wire guide formed on said insulating means to facilitate the projection of wires from said fixture out through said hickey opening.

2. A combination fixture-supporting unit comprising a coupling, a shank integrally formed thereon, a hickey stem connected therewith, insulating means separating said coupling shank from said hickey stem, wire guide insulation means connected with said insulating means and projecting into the hickey stem, rivet means for rigidly securing the hickey stem to said coupling, and insulating means engaged with said rivet means to insulate the same from said coupling.

3. A fixture-supporting unit comprising a coupling, a hickey stem interfitting the same, insulating means separating said coupling from said hickey stem and an insulation guide connected with the insulating means to facilitate projection of fixture wires through the hickey stem.

4. A fixture-supporting unit comprising a coupling, a hickey stem, insulating means engaged around said coupling and projecting into said hickey stem, insulation means for rigidly securing the coupling and the stem together, and an insulation wire guide carried by the coupling and projecting into the hickey stem to guide fixture wires from the interior of said hickey stem out through the hickey opening.

5. A fixture-supporting unit comprising a threaded coupling, a stem having a hickey opening therein, a shank integrally formed on said coupling and projecting into said stem, an insulation disc and sleeve engaged on said shank to insulate the coupling from said stem, rivet means for rigidly securing said stem to said shank, means for insulating the rivet means from said coupling shank, and an insulation wire guide formed in the inner end of said insulation sleeve and positioned adjacent the hickey opening in said stem to serve as a guide for fixture wires from the interior of said stem out through said hickey opening.

In testimony whereof I have hereunto subscribed my name at Chicago, Cook County, Illinois.

JOHN B. GLOWACKI.